United States Patent [19]

Yamada et al.

[11] Patent Number: 5,099,103
[45] Date of Patent: Mar. 24, 1992

[54] FLUX-CORED WIRE FOR GAS SHIELDED ARC WELDING

[75] Inventors: Minoru Yamada, Kamakura; Kazuo Ikemoto, Chigasaki; Shigeo Nagaoka, Fujisawa, all of Japan

[73] Assignee: Kabushiki Kaisha Kobe Seiko Sho, Kobe, Japan

[21] Appl. No.: 618,883

[22] Filed: Nov. 28, 1990

[30] Foreign Application Priority Data

Dec. 8, 1989 [JP] Japan .................................. 1-320092

[51] Int. Cl.$^5$ .............................................. B23K 35/36
[52] U.S. Cl. ............................ 219/145.22; 219/146.31
[58] Field of Search .................... 219/145.22, 146.24, 219/146.3, 146.31, 137 WM

[56] References Cited

U.S. PATENT DOCUMENTS

| | | | |
|---|---|---|---|
| 3,585,352 | 6/1971 | Zvanut | 219/137 WM |
| 3,805,016 | 4/1974 | Soejima et al. | 219/137 WM |
| 4,349,721 | 9/1982 | Mentink et al. | 219/146.24 |
| 4,465,921 | 8/1984 | Sakai et al. | 219/146.24 |

*Primary Examiner*—Clifford C. Shaw
*Attorney, Agent, or Firm*—Oblon, Spivak, McClelland, Maier & Neustadt

[57] ABSTRACT

A flux-cored wire for gas-shielded arc welding comprises a steel sheath and a flux composition filled in the steel sheath. The flux composition is present in an amount of 8 to 25 wt. %, based on the total amount of the steel sheath and the flux composition. The flux composition comprises, based on the total weight of the flux, 10 to 30% of $TiO_2$, 0.1 to 0.6% of $Na_2O$ is in the range of 20 to 100:1, 0.01 to 2.0% of a metal fluoride calculated as F, and 0.005 to 0.4% of moisture. $Bi_2O_3$ may also be included in the composition.

10 Claims, 1 Drawing Sheet

Amount of $Na_2O$ (WT. %) vs. Amount of $TiO_2$ (WT. %)

- Line: $\frac{TiO_2}{Na_2O} = 20$ — BEAD: CONVEX FORM
- Line: $\frac{TiO_2}{Na_2O} = 1$
- Region (bounded by 0.1 ≤ $Na_2O$ ≤ 0.6, $TiO_2$ up to 30): BEAD FORM, PIT FORMATION RESISTANCE, GAS GROOVE FORMATION RESISTANCE — VERY EXCELLENT
- Below line $TiO_2/Na_2O = 1$: PRODUCING A LARGE NUMBER OF PITS & GAS GROOVES

PAINT

12t × 100w × 1000ℓ

FLUX-CORED WIRE FOR GAS SHIELDED ARC WELDING

BACKGROUND OF THE INVENTION

1. Field Of The Invention

This invention relates to the art of arc welding and more particularly, to a flux-cored wire for gas shielded arc welding which exhibits a good pore formation resistance in gas shielded arc welding of carbon steels and low alloy steels, particularly corroded or paint coated steels.

2. Description Of The Prior Art

In the fields of shipbuilding and bridge construction, titania flux-cored wires have been frequently employed in gas shielded arc welding and, particularly, in carbon dioxide arc welding. This is because the titania-based flux-cored wire makes all position welding at a high efficiency and ensures a good appearance and shape of beads and good welding operability. In order to prevent steel materials from corrosion in the above fields of consumption, however, it is usual to apply, prior to welding, primary rust preventive paints (hereinafter referred to simply as primer) such as wash primers, inorganic zinc primers and the like. This presents the problem that at the time of welding and particularly, fillet welding, pores such as pits, gas grooves and the like are often produced with a lowering of quality and an additional number of steps for re-adjustment.

For solving the above problem, the primer at or around welding portions is preliminarily removed by polishing with a grinder or a paper machine. The polished portion is liable to produce corrosion, thus placing limitation on a storage period not only outdoors, but also indoors.

On the other hand, there has been developed a high hydrogen rate wire having an amount of weld metal-diffusable hydrogen of from 20 to 30 ml/100 grams as a flux-cored wire having a pore resistance against primer-coated steel sheets. In view of the possibility in occurrence of low temperature crack, its application is limited to soft steels and structures wherein a degree of restriction on thin sheets is small.

SUMMARY OF THE INVENTION

It is accordingly an object of the invention to provide a flux-cored wire for gas shielded arc welding which is applicable to various steel materials without limitation.

It is another object of the invention to provide a flux-cored wire for gas shielded arc welding whereby pores such as pits and gas grooves are not produced in welding of steel materials on or in which primers have been applied or corrosion has taken place, thereby ensuring a good bead.

It is a further object of the invention to provide a flux-cored wire which makes use of the merits involved in known titania-based flux-cored wires and which solves the problems involved in primer-coated steel sheets.

The above objects can be achieved, according to the invention, by a flux-cored wire for gas shielded arc welding which comprises a steel sheath and a flux composition filled in the steel sheath at a flux rate of 8 to 25 wt %, the flux composition comprising, based on the weight of the total flux, 10 to 30% of $TiO_2$, 0.1 to 0.6% of $Na_2O$ provided that a ratio of $TiO_2$ and $Na_2O$ is in the range of 20 to 100:1, 0.01 to 2.0% of a metal fluoride calculated as F, and 0.05 to 0.4% of moisture.

Optionally, $Bi_2O_3$ may be further contained in the composition provided that the ratio of $Na_2O$ and $Bi_2O_3$ is in the range of 1 to 10:1.

PREFERRED EMBODIMENTS OF THE INVENTION

Figures 1, 2:
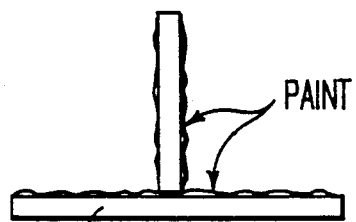
FIG. 1 is a graphical representation of the $TiO_2/Na_2O$ ratio in relation to the bead form, the pit formation resistance and the gas groove formation resistance.
FIG. 2 is a schematic view of a shape of welding joint used in Example.

The reasons why the types and contents of flux components are determined in the present invention are described along with their effects.

$TiO_2$: 10 to 30%

$TiO_2$ is a flux component as a base. If the content is less than 10%, the amount of slag becomes insufficient, so that the slag does not cover the entire surface of the resultant bead, with a failure in the bead appearance. On the other hand, over 30%, the slag covering property becomes good. However, since $TiO_2$ has a high solidifying temperature and the slag is quickly solidified, gas components such as hydrogen and water vapor produced from the primer or rust are prevented from escaping to outside, with a tendency that gas groove defects are formed in the bead surface.

Accordingly, the amount of $TiO_2$ is in the range of from 10 to 30%, preferably from 15 to 25%. $TiO_2$ sources may include rutile, reduced ilmenite, leucoxene, white titanium, titanium slag and the like.

$Na_2O$: 0.1 to 0.6%

$Na_2O$ can lower the slag viscosity and permits gas components such as hydrogen and water vapor and metallic vapors such as Zn, which will cause formation of pores in the molten metal, to be readily floated, thus facilitating them to escape to the outside. In addition, when used in small amounts, this component has the effect of improving the arc stability. However, if the content of $Na_2O$ is less than 0.1%, the above effect is not expected. On the other hand, over 0.6%, a melt drop becomes too large in size, with the result that its transfer becomes irregular, leading to an increase of spatter.

Accordingly, the content of $Na_2O$ is in the range of from 0.1 to 0.6%, preferably from 0.2 to 0.4%. The sources for $Na_2O$ include feldspar, water glass, anhydrous sodium silicate, soda glass and the like.

The above flux components should be properly controlled in such a way that the ratio, $TiO_2/Na_2O$, is within the following range.

$TiO_2/Na_2O$ ratio: 20 to 100:1

$Na_2O$ has to be properly added depending on the amount of $TiO_2$. This is because $TiO_2$ and $Na_2O$ have reverse actions on the viscosity properties. The former serves to increase the viscosity and the latter decreases the viscosity. When the amount of $Na_2O$ is increased, the slag becomes dense, tending to degrade the slag releasability.

More particularly, as shown in FIG. 1, when the ratio of $TiO_2$ and $Na_2O$ is less than 20:1, the slag viscosity lowers excessively, under which a bead shape control of the slag cannot be expected. Especially, in horizontal fillet welding, the bead is shaped in a convex form and the slag releasability is worsened. Thus, such a ratio is unfavorable.

When the ratio of $TiO_2$ and $Na_2O$ exceeds 100:1, the slag viscosity becomes excessive, pores such as pits, gas grooves and the like are unfavorably liable to produce with paint-coated or corroded steel sheets.

When the ratio of $TiO_2/Na_2O$ is in the range of 20 to 100:1, good bead shape, pit formation resistance and gas groove formation resistance (i.e. pore formation resistance) are attained. Also, good slag releasability is obtained.

Accordingly, the ratio (by weight) of $TiO_2/Na_2O$ is controlled to be in the range of 20 to 100:1, preferably 40 to 80:1.

Metal Fluoride (calculated as F): 0.01 to 2.0%

Metal fluorides such as $CaF_2$, $NaF$, $AlF_3$, $BaF_2$, $Na_3AlF_6$, $Na_2SiF_6$, $K_2SiF_6$, $K_2ZrF_6$, $LiF_2$, $MgF_2$, $SrF_2$ and the like act to control the convergence of arc and the viscosity of slag in order to dissipate gases which cause pores to be produced. The fluorides also act to reduce an amount of diffusable hydrogen which causes the low temperature crack of weld metals. Accordingly, the amount of the metal fluoride is in the range of from 0.01 to 2.0% calculated as F. At less than 0.01%, the above effect is not expected. On the other hand, over 2.0%, although the amount of diffusable hydrogen is reduced, an arc becomes too intense with respect to welding operability, leading to an unfavorable tendency toward an increase of spatter and undercut defects. Accordingly, the content, as F, of the metal fluoride is in the range of from 0.01 to 2.0%, preferably from 0.1 to 1.0%.

Moisture: 0.005 to 0.4%

With regard to moisture, there may be the case where moisture is intentionally added or the case where moisture is reduced to an extent as small as possible. In the practice of the invention, moisture is purposely added as in the former case. More particularly, it is general that when welding current and voltage are varied, arc stability is deteriorated. If moisture is purposely added, an allowance in the arc stability becomes wide for the variation of the welding current and voltage. However, when the moisture content is less than 0.005%, the effect is not expected. Over 0.4%, an arc becomes too intense or spatter unfavorably increases.

Accordingly, the moisture content is in the range of from 0.005 to 0.4%, preferably from 0.005 to 0.1%. It will be noted that the measurement of the moisture content is made according to Karl Fischer's method using a heating temperature of 750° C. and an atmospheric gas of Ar.

In the present invention, $Bi_2O_3$ may be appropriately added, if necessary. The amount of $Bi_2O_3$ is preferably in the range of from 0.01 to 0.6%.

$Na_2O/Bi_2O_3$ Ratio: 1 to 10:1

In general, $Bi_2O_3$ is used to improve the releasability of slag. In an ordinary case, mere addition may be sufficient, but with corroded steel sheet or welding at narrowed portions, little effect can be expected. It has been found that when $Bi_2O_3$ is added, it is necessary to make a balance in amount of $NaO_2$, by which good slag releasability can be obtained at the portions mentioned above. More particularly, the ratio of $Na_2O/Bi_2O_3$ is determined to be in the range of 1 to 10:1, preferably 1 to 5:1. When the ratio is less than 1:1 or larger than 10:1, the slag releasability at narrowed portions becomes poor.

Flux Rate: 8 to 25%

When the flux rate is less than 8%, the arc becomes unstable with an unfavorably increasing amount of spatter. Over 25%, the amount of slag unfavorably increases with an increase in fluidity of the slag along with the bead being irregular. The flux rate is in the range of from 8 to 25%.

The flux composition comprises, aside from the above components, the balance of a slug-forming agent such as $K_2O$, $SiO_2$, $ZrO_2$, $MgO$, $Al_2O_3$, $MnO_2$, $MnO$, $FeO$, $Fe_2O_3$, $Fe_3O_4$, $LiFeO_2$, $Li_2SiO_3$, $Li_2MnO_3$, $B_2O_3$ and the like and a metallic powder such as Mn, Si, Al, Ni, Cr, Mo, Cu, B, Li, Fe and the like as in the case of titania-based flux-cored wires. In the practice of the invention, any limitation is not placed on the sectional shape and diameter of the flux-cored wire according to the invention, the composition of a steel sheath (such as of carbon steels, low alloy steels and the like), shielding gases, types of steels to be applied and the like.

The present invention is described by way of examples.

EXAMPLE

A metallic sheath constituting a wire was made of a low carbon steel (C: 0.05%, Si: 0.01%, Mn: 0.42, P: 0.005%, S: 0.003%), in which fluxes having compositions indicated in Table 1 were filled at a flux rate of 15%, thereby making flux-cored wires.

The thus made wires were used for performing a gas-shielded fillet arc welding test under the following welding conditions.

Welding Conditions

Diameter of the wire: 1.2 mm$\phi$

Welding current-voltage: 300A-32V

Welding rate: 70 cpm.

Tested steel sheet: 12 mm thick × 100 mm wide × 1000 mm long paint-coated steel sheet (amount of paint coating: 30–40$\mu$)

Joint shape: see FIG. 2

Shielding gas: 100% $CO_2$, 25 liters/minute

The results of the welding test are shown in Table 2.

In Table 2, Wire Nos. A are for comparison and Wire Nos. B are for examples of the invention.

The results of Table 2 reveal that Comparative Example A-1 is a case where $TiO_2$ is insufficient with an excess of $Na_2O$. In this case, the covering properties of the slag are poor. Since an arc becomes too intense, the beads are not uniformly formed with an increase in amount of spatter.

In Comparative Example A-2, $TiO_2$ is used in excess and an amount of fluorine is also in excess. The resistance to pore formation is very poor with an increasing amount of spatter, and undercut defects are liable to occur.

Comparative Example A-3 is a case where $Na_2O$ and moisture are in shortage. The arc is slightly unstable with spatter being produced in large amounts. The bead is of a convex form.

Comparative Example A-4 is a case where $Na_2O$ and moisture are both in excess. The arc is converged and is too intense, so that the arc is unstable with a very great amount of spatter.

Comparative Example A-5 is a case where the fluorine is insufficient and moisture is in excess. Accordingly, an amount of diffusable hydrogen increases and the arc is greatly influenced by the excess moisture. The arc is too intense with an increasing amount of spatter.

Comparative Examples A-6 and A-7 are cases where the $TiO_2/Na_2O$ ratios are outside the scope of the invention. Although the arc stability and the amount of spatter are good, the pore formation resistance is very poor.

Comparative Examples A-8 and A-9 are cases where the $TiO_2/Na_2O$ ratio is outside the scope of the invention although the $Na_2O/Bi_2O_3$ ratio is within the scope of the invention. Thus, the slag releasability is not improved.

In contrast, Examples B-1 to B-10 of the invention are good with respect to the arc stability, resistance to pore formation, spatter and bead. The slag releasability is also good. Especially, better slag releasability is obtained in Examples B-8 to B-9 of the invention wherein the $Na_2O/Bi_2O_3$ ratio is within a range of 1 to 10:1.

As will be apparent from the foregoing description, the flux-cored wires of the present invention are applicable to various types of steels including paint-coated steel sheets and corroded steel sheets. Even for fillet welding, pores such as pits and gas grooves are not produced without involving any undercut defect and with uniform, smooth beads being obtained. Since the slag releasability is very excellent, the number of welding steps can be reduced in welding of narrow fillet joints of red rust steel sheets.

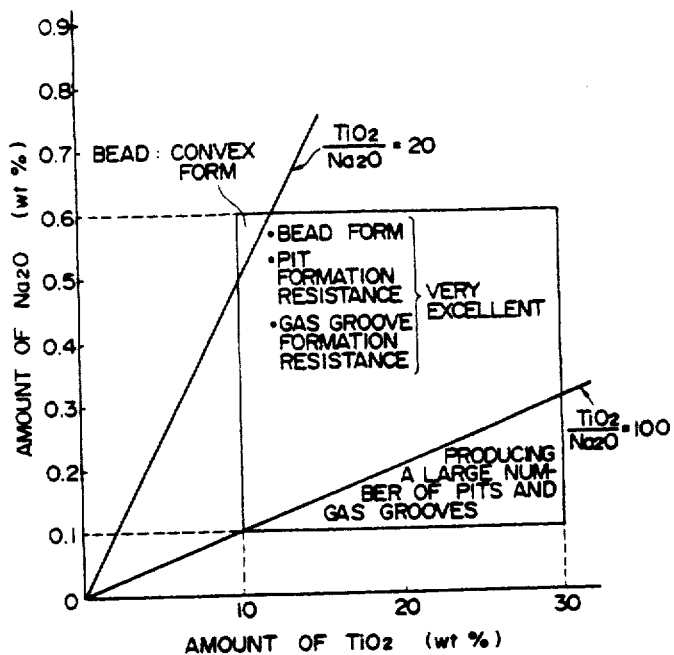

What is claimed is:

1. A flux-cored wire for gas shielded arc welding which comprises a steel sheath and a flux composition filled in the steel sheath, said flux being present in an amount of 8 to 25 wt %, based on the total weight of said steel sheath and said flux composition, the flux composition comprising, based on the total weight of the flux, 10 to 30% of $TiO_2$, 0.1 to 0.6% of $Na_2O$ provided that a ratio of $TiO_2$ to $Na_2O$ is in the range of 20 to 100:1, 0.01 to 2.0% of a metal fluoride calculated as F, and 0.005 to 0.4% of moisture.

2. A flux-cored wire according to claim 1, wherein $TiO_2$ is contained in an amount of from 15 to 25%.

3. A flux-cored wire according to claim 1, wherein $Na_2O$ is contained in an amount of from 0.2 to 0.4%.

4. A flux-cored wire according to claim 1, wherein the ratio of $TiO_2$ to $Na_2O$ is in the range of from 40 to 80:1.

5. A flux-cored wire according to claim 1, wherein said metal fluoride is a member selected from the group consisting of $CaF_2$, $NaF$, $AlF_3$, $BaF_2$, $Na_3AlF_6$, $Na_2SiF_6$, $K_2SiF_6$, $K_2ZrF_6$, $LiF_2$, $MgF_2$, $SrF_2$ and mixtures thereof.

TABLE 1

| | Flux Composition (wt % based on total flux) | | | | | | | | | | | | | | | |
|---|---|---|---|---|---|---|---|---|---|---|---|---|---|---|---|---|
| Wire No. | $TiO_2$ | $Na_2O$ | F (amount calculated) | Moisture | $K_2O$ | $SiO_2$ | $ZrO_2$ | MgO | $Al_2O_3$ | $Bi_2O_3$ | Mn | Si | FeO | Iron Powder | $TiO_2/Na_2O$ Ratio | $Na_2O/Bi_2O_3$ Ratio |
| A-1 | 9.5 | 0.70 | 0.05 | 0.10 | 1.0 | 7.0 | 4.0 | — | — | — | 18 | 5 | — | balance | 13.5 | — |
| A-2 | 33 | 0.50 | 2.1 | 0.05 | — | 10.0 | — | 2.0 | 7.0 | — | 16 | 4 | — | " | 66 | — |
| A-3 | 15 | 0.09 | 1.0 | 0.004 | 0.5 | 5.0 | 1.0 | 1.5 | 3.0 | — | 5 | 4 | 0.3 | " | 166 | — |
| A-4 | 27 | 0.65 | 1.0 | 0.55 | — | — | 10.0 | 5.0 | 1.0 | — | 6 | 3 | — | " | 41 | — |
| A-5 | 12 | 0.50 | 0.009 | 0.42 | 0.7 | 2.5 | — | — | 4.0 | — | 6 | 2 | — | " | 24 | — |
| A-6 | 11 | 0.55 | 0.08 | 0.15 | — | 15 | — | 1 | — | — | 8 | 2 | 0.1 | " | 19.6 | — |
| A-7 | 22 | 0.20 | 1.5 | 0.015 | 1.0 | 10 | 20 | — | 1 | — | 9 | 3 | — | " | 110 | — |
| A-8 | 22 | 0.20 | 0.5 | 0.015 | — | — | 12 | 2 | 2 | — | 9 | 2 | — | " | 110 | — |
| A-9 | 9.5 | 0.70 | 0.05 | 0.10 | 0.8 | 11.0 | 5.0 | 7.0 | 4.5 | 0.04 | 10 | 5 | — | " | 13.5 | — |
| B-1 | 11 | 0.25 | 0.02 | 0.008 | 0.15 | 5.5 | 13.5 | 3.0 | 1.0 | 0.14 | 10 | 4 | — | " | 44 | — |
| B-2 | 29 | 0.50 | 1.8 | 0.19 | 0.10 | 10.0 | 3.0 | — | — | — | 9 | 3 | 0.5 | " | 58 | — |
| B-3 | 15 | 0.40 | 1.0 | 0.01 | — | 15.0 | 15.0 | 2.0 | 4.0 | — | 10 | 2 | — | " | 37 | — |
| B-4 | 15 | 0.15 | 0.05 | 0.10 | 0.50 | — | 7.5 | 10.0 | 3.0 | — | 6 | 3 | — | " | 100 | — |
| B-5 | 11 | 0.50 | 0.9 | 0.09 | 1.0 | 7.0 | — | 7.0 | 4.5 | — | 4 | 5 | 0.1 | " | 22 | — |
| B-6 | 26 | 0.40 | 0.01 | 0.006 | 0.2 | 6.0 | 5.5 | 3.0 | 1.0 | — | 18 | 4 | — | " | 65 | — |
| B-7 | 22 | 0.45 | 0.04 | 0.08 | — | 18.0 | 1.0 | 1.0 | 10.0 | 0.56 | 9 | 4 | — | " | 48 | 0.8 |
| B-8 | 26 | 0.35 | 0.25 | 0.38 | 0.5 | 4.0 | 12.0 | 4.0 | 2.0 | 0.04 | 7 | 2 | 0.2 | " | 74 | 9.5 |
| B-9 | 13 | 0.20 | 0.30 | 0.05 | 0.4 | 5.5 | 21 | 3.5 | 1.0 | 0.04 | 7 | 3 | — | " | 65 | 5.0 |
| B-10 | 27 | 0.58 | 0.60 | 0.009 | 1.1 | 9.5 | 11.0 | 7.0 | 6.5 | 0.05 | 6 | 2 | — | " | 46 | 11.6 |

TABLE 2

| | Results Of Evaluation Of Welding | | | | | |
|---|---|---|---|---|---|---|
| Wire No. | resistance to pore formation | arc Stability | amount of spatters | shape of bead | uniformity of bead | slug releasability |
| Comparative Examples: | | | | | | |
| A-1 | Δ | Δ | X | Δ | X | X |
| A-2 | X | Δ | X | Δ | Δ | Δ |
| A-3 | X | Δ | X | Δ | Δ | X |
| A-4 | X | X | X | Δ | Δ | X |
| A-5 | Δ | Δ | X | Δ | Δ | X |
| A-6 | X | ○ | ○ | Δ | ○ | ○ |
| A-7 | X | ○ | ○ | Δ | ○ | ○ |
| A-8 | X | Δ | Δ | Δ | Δ | Δ |
| A-9 | Δ | X | X | Δ | Δ | Δ |
| Inventive Examples: | | | | | | |
| B-1 | ◉ | ○ | ○ | ○ | ◉ | ○ |
| B-2 | ◉ | ◉ | ◉ | ◉ | ○ | ○ |
| B-3 | ◉ | ○ | ○ | ○ | ◉ | ○ |
| B-4 | ◉ | ○ | ○ | ○ | ◉ | ○ |
| B-5 | ◉ | ○ | ○ | ○ | ◉ | ○ |
| B-6 | ◉ | ◉ | ◉ | ◉ | ○ | ○ |
| B-7 | ◉ | ◉ | ◉ | ○ | ○ | ○ |
| B-8 | ◉ | ◉ | ◉ | ◉ | ○ | ◉ |
| B-9 | ◉ | ○ | ○ | ○ | ◉ | ◉ |
| B-10 | ◉ | ◉ | ◉ | ◉ | ○ | ○ |

Note: Standards for evaluation of the results of the welding:
◉: very good  ○: good  Δ: slightly poor  x: poor 6. A flux-cored wire according to claim 1, wherein the metal fluoride is contained in the range of from 0.1 to 1.0%.

7. A flux-cored wire according to claim 1, wherein the moisture is contained in an amount of from 0.005 to 0.1%.

8. A flux-cored wire according to claim 1, further comprising $Bi_2O_3$ in such a way that the ratio of $Na_2O$ to $Bi_2O_3$ is in the range of 1 to 10:1.

9. A flux-cored wire according to claim 8, wherein $Bi_2O_3$ is contained in an amount of from 0.01 to 0.6%.

10. A flux-cored wire according to claim 1, further comprising at least one member selected from the group consisting of $K_2O$, $SiO_2$, $ZrO_2$, $MgO$, $Al_2O_3$, $MnO_2$, $MnO$, $FeO$, $Fe_2O_3$, $Fe_3O_4$, $LiFeO_2$, $Li_2SiO_3$, $Li_2MnO_3$, $B_2O_3$, Mn, Si, Al, Ni, Cr, Mo, Cu, B, Li, Fe and mixtures thereof.

* * * * *

UNITED STATES PATENT AND TRADEMARK OFFICE
CERTIFICATE OF CORRECTION

PATENT NO. : 5,099,103

DATED : March 24, 1992

INVENTOR(S) : Minoru Yamada et al.

It is certified that error appears in the above-identified patent and that said Letters Patent is hereby corrected as shown below:

The title page, showing an illustrative figure, should be deleted and substitute therefor the attached title page.

<u>IN THE DRAWINGS</u>

Delete Figure 1 and substitute Figure 1 as shown on the attached page.

Signed and Sealed this

Fourteenth Day of July, 1998

Attest:

BRUCE LEHMAN

*Attesting Officer*       *Commissioner of Patents and Trademarks*

United States Patent

Yamada et al.

Patent Number: 5,099,103
Date of Patent: Mar. 24, 1992

[54] FLUX-CORED WIRE FOR GAS SHIELDED ARC WELDING

[75] Inventors: Minoru Yamada, Kamakura; Kazuo Ikemoto, Chigasaki; Shigeo Nagaoka, Fujisawa, all of Japan

[73] Assignee: Kabushiki Kaisha Kobe Seiko Sho, Kobe, Japan

[21] Appl. No.: 618,883

[22] Filed: Nov. 28, 1990

[30] Foreign Application Priority Data

Dec. 8, 1989 [JP] Japan .................................. 1-320092

[51] Int. Cl.⁵ .............................................. B23K 35/36
[52] U.S. Cl. .............................. 219/145.22; 219/146.31
[58] Field of Search ..................... 219/145.22, 146.24, 219/146.3, 146.31, 137 WM

[56] References Cited

U.S. PATENT DOCUMENTS

| | | | |
|---|---|---|---|
| 3,585,352 | 6/1971 | Zvanut | 219/137 WM |
| 3,805,016 | 4/1974 | Soejima et al. | 219/137 WM |
| 4,349,721 | 9/1982 | Mentink et al. | 219/146.24 |
| 4,465,921 | 8/1984 | Sakai et al. | 219/146.24 |

*Primary Examiner*—Clifford C. Shaw
*Attorney, Agent, or Firm*—Oblon, Spivak, McClelland, Maier & Neustadt

[57] ABSTRACT

A flux-cored wire for gas-shielded arc welding comprises a steel sheath and a flux composition filled in the steel sheath. The flux composition is present in an amount of 8 to 25 wt. %, based on the total amount of the steel sheath and the flux composition. The flux composition comprises, based on the total weight of the flux, 10 to 30% of $TiO_2$, 0.1 to 0.6% of $Na_2O$ is in the range of 20 to 100:1, 0.01 to 2.0% of a metal fluoride calculated as F, and 0.005 to 0.4% of moisture. $Bi_2O_3$ may also be included in the composition.

10 Claims, 1 Drawing Sheet

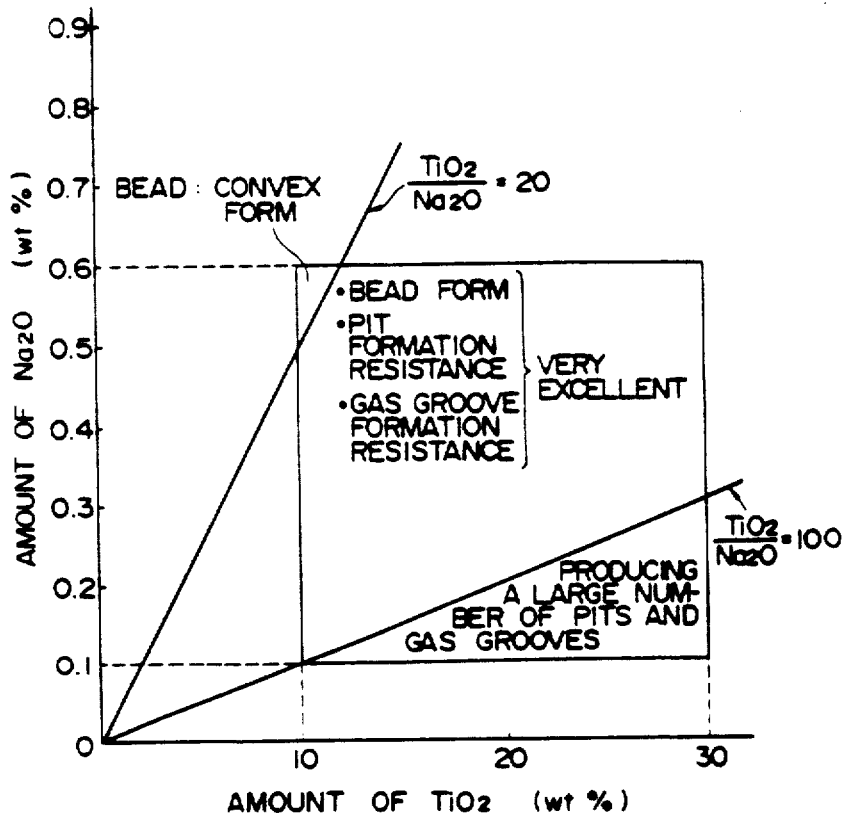

UNITED STATES PATENT AND TRADEMARK OFFICE
CERTIFICATE OF CORRECTION

PATENT NO. : 5,099,103

DATED : March 24, 1992

INVENTOR(S) : Minoru Yamada et al.

It is certified that error appears in the above-identified patent and that said Letters Patent is hereby corrected as shown below: